Sept. 20, 1949.　　　M. P. SPARTALIS　　　2,482,601
COOKING MACHINE

Filed July 4, 1945　　　3 Sheets-Sheet 2

Inventor
Michael P. Spartalis
By his Attorneys

Sept. 20, 1949.        M. P. SPARTALIS        2,482,601
                        COOKING MACHINE
Filed July 4, 1945                          3 Sheets-Sheet 3
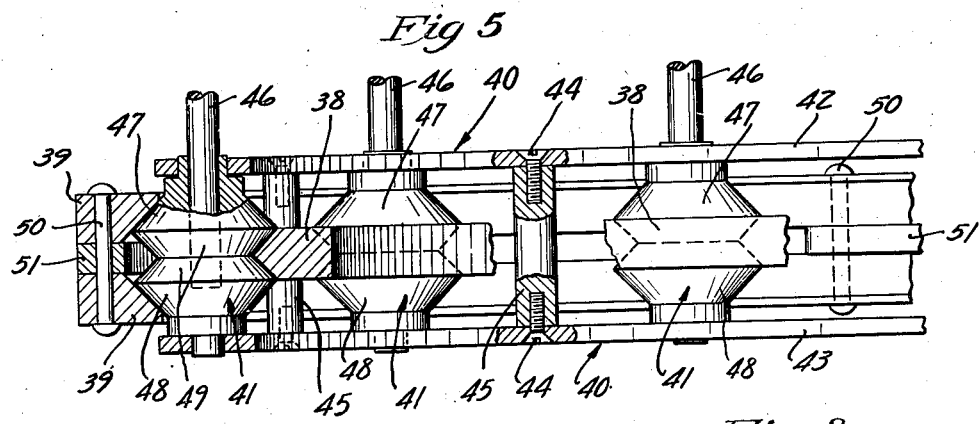
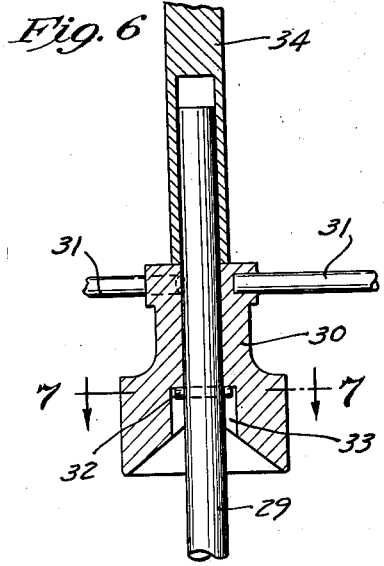
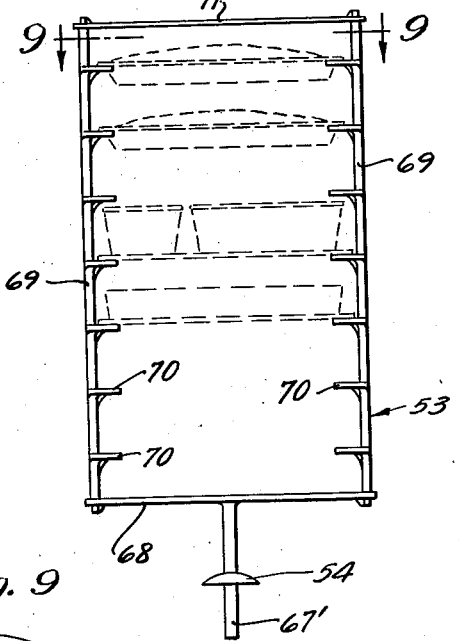
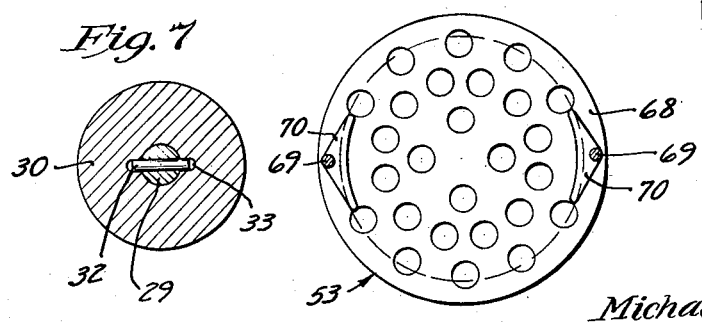
Inventor
Michael P. Spartalis
By his Attorneys
Merchant & Merchant Patented Sept. 20, 1949

2,482,601

UNITED STATES PATENT OFFICE 2,482,601

COOKING MACHINE

Michael P. Spartalis, St. Paul, Minn., assignor of two-fifths to Athena M. Spartalis, St. Paul, two-fifths to Constantine M. Rallis, Minneapolis, and one-fifth to Nick Chiomes, St. Paul, Minn.

Application July 4, 1945, Serial No. 603,173

17 Claims. (Cl. 99—421)

My present invention relates particularly to improvements in cooking machines of the general type disclosed and claimed in my prior Letters Patent of the United States No. 2,179,646, of November 14, 1939, and which type of machine involves a cooking chamber or oven containing rotary food conveying mechanism. In the preferred embodiment of the invention herein illustrated, as in the machine illustrated in my said prior patent, the rotary food conveying mechanism comprises a rotary conveyor of generally circular form equipped with a circumferentially-circular form equipped with a circumferentially-spaced series of planetary food holders that are rotated on their own axes while rotating about the axis of the circular conveyor. The machine herein illustrated, like the machine of my said prior patent, also preferably embodies an inner rotary food holder located within the circle described by the circumferentially-spaced series of food holders. While machines of the general character described were primarily designed for the barbecuing, baking, or roasting of meats, vegetables, and the like, it has been found that machines of the type disclosed herein and in my prior patent may also be very advantageously used in the baking of bread, cake, pastries, and the like.

The machine of my prior patent has proven highly satisfactory for the purpose set forth, but has been found to be subject to the following objections, to wit:

a. The rotary food conveying mechanism of the machine illustrated in my prior patent and certain of its driving connections are exposed to drippings from food carried thereby, and this feature is objectionable because it necessitated frequent removal of the conveyor mechanism and certain of the driving connections for cleaning and servicing;

b. In the machine illustrated in my prior patent, juices from food articles carried by the circumferentially-spaced food holders of the rotary annular conveyor and juices from a food article or articles carried by the inner food holder, located within the circle described by the said circumferentially-spaced series of food holders, were mixed and directed to a common receptacle. This mixing of the juices is particularly objectionable when foods of different kinds are carried by the outer and inner food holders respectively. For example, if a number of chickens are mounted on the circumferentially-spaced series of outer food holders and a ham is mounted on the inner food holder for simultaneous cooking, it would be desirable to maintain a separation of and collect in different vessels or receptacles the juices from the chickens and ham respectively, so that the juices from the chickens could be served with chicken orders and so that the juices from the ham could be served with ham orders, if desired. However, no means for accomplishing such separation of juices was present in the machine of my prior patent; and c. The circular or annular conveyor mechanism of the machine of my prior patent was removable from the machine in several parts requiring individual handling and reassembly. This was objectionable, first, because of the difficulty in handling a number of parts during removal and washing, and, secondly, because of the difficulty encountered by inexperienced persons in properly reassembling the conveyor mechanism.

Generally speaking, it is, therefore, an object of my present invention to overcome the above noted and other objectionable features of the machine of my prior Patent No. 2,179,646. To these ends, my present invention provides an improved conveyor mechanism for the circumferentially-spaced series of outer food holders in which the main parts of the conveyor mechanism proper are removable and replaceable as a unit that may be readily cleaned without disassembly. The conveyor mechanism is protected against drippings from the food carried thereby, and juices dripping from food on the circumferentially-spaced series of outer food holders and juices dripping from the food article or articles carried by the inner food holder are maintained separate and are collected in separate receptacles or containers, so that each is uncontaminated by the other. In the preferred embodiment of the invention, herein illustrated, these and other important objectives have been accomplished in a machine wherein the circular or annular conveyor mechanism is of the planetary type.

The above and other important objects and advantages of the invention, and which include improved driving connections for the conveyor mechanism, will be made clear from the following specification, claims, and appended drawings.

In the accompanying drawings, like characters indicate like parts throughout the several views.

Referring to the drawings:

Fig. 4 is an enlarged fragmentary view in top elevation, with some parts broken away, of the annular conveyor mechanism and part of its driving linkage;

Fig. 5 is a fragmentary sectional view, taken on the line 5—5 of Fig. 3, of the annular conveyor mechanism, with some parts broken away and some parts shown in section;

Fig. 6 is an enlarged fragmentary view of part of the driving connections for the annular and central food conveyors and holders;

Fig. 7 is a detail sectional view taken on the line 7—7 of Fig. 6;

Fig. 8 is an enlarged view in side elevation of a modified form of food holder for use in the annular conveyor; and Fig. 9 is a sectional view taken on the line 9—9 of Fig. 8.

Figure 1:
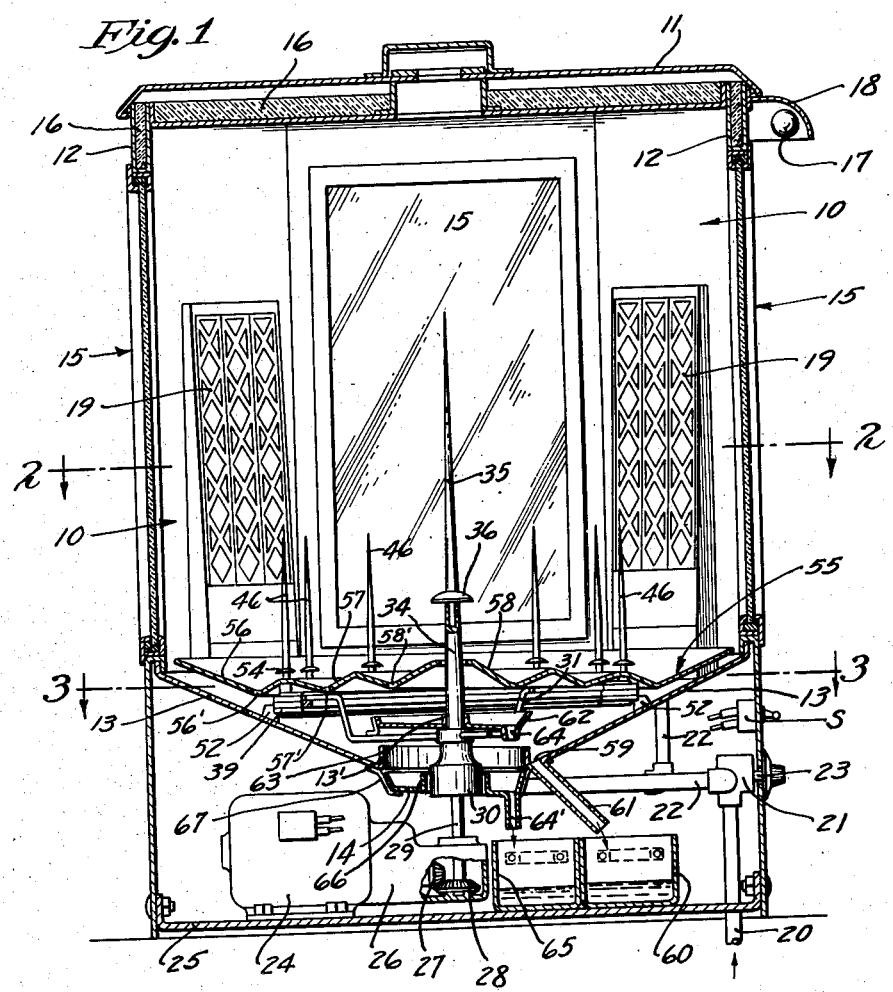
Fig. 1 is a view of a cooking machine involving a preferred embodiment of the invention, and showing the same in vertical axial section, with some parts broken away and some parts on the section line shown in full.
Figure 2:
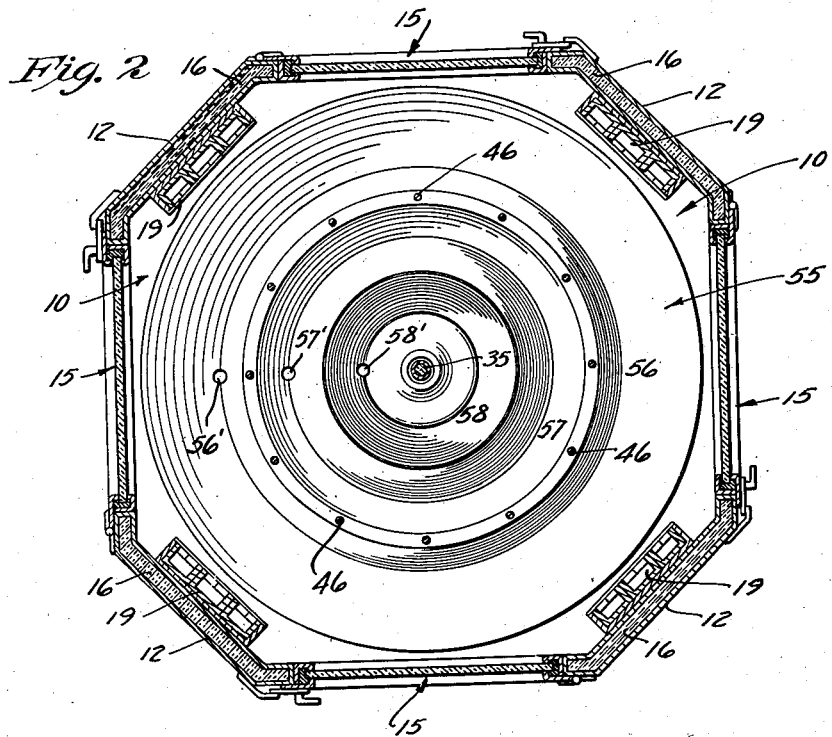
Fig. 2 is a transverse horizontal sectional view taken on the line 2—2 of Fig. 1.
Figure 3:
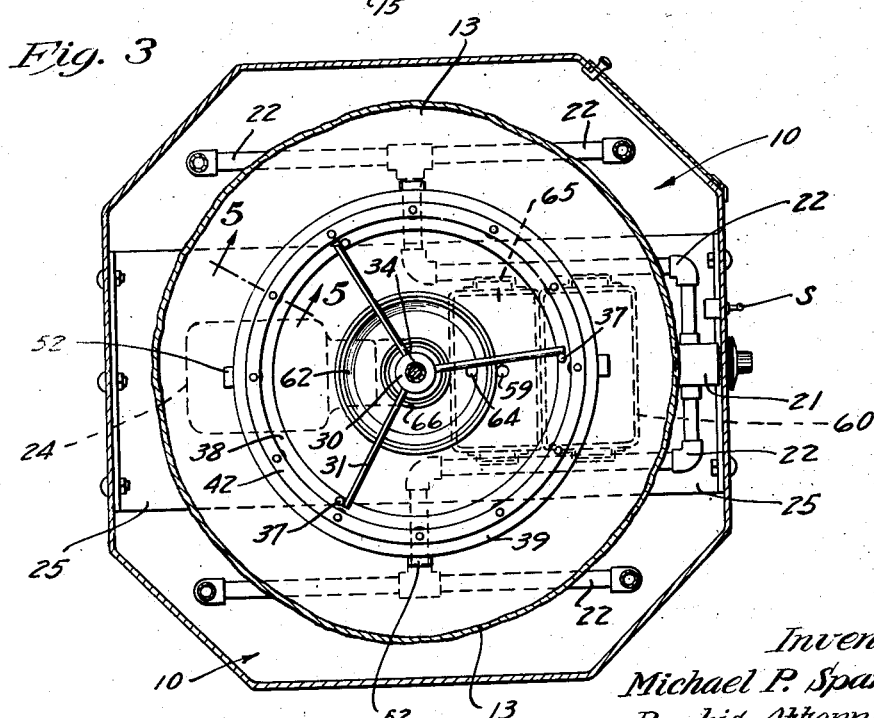
Fig. 3 is a transverse horizontal sectional view taken on the line 3—3 of Fig. 1.

In the embodiment of the invention illustrated, the oven or cooking chamber 10 is defined by a casing having a top 11, side walls 12, and a generally downwardly and inwardly inclined bottom. The bottom of the cooking chamber is composed of a downwardly and inwardly declined basin-forming outer portion 13 and a removable inner basin-forming portion 14. These bottom portions 13 and 14 may hereinafter also be referred to as outer and inner collecting portions respectively. In the form illustrated, the casing has eight sides 12. Four of these sides 12 are provided with glazed doors 15 permitting free access to the interior of the oven or cooking chamber, and also allowing continuous inspection or viewing of the contents during the cooking or heat-treating operation. The top 11 and walls 12 are preferably insulated as shown at 16. The interior of the casing may be illuminated by a suitable lamp 17 in a directing reflector 18 (see Fig. 1).

In the preferred arrangement illustrated, four heating units 19 are symmetrically mounted on the four unglazed walls 12 of the cooking chamber. These heating units 19 are preferably of the radiant gas-burning type shown more fully in my prior Patent No. 2,179,646, and comprise suitable gas burners mounted behind a grill-work of refractory material. The gas burners, not shown, are supplied with gas from a suitable source, not shown, through a supply pipe 20, a control valve 21, and branch pipe lines 22. In this manner, gas supplied to the four burners of the heat units 19 is controlled by a common valve 21 having a dial-equipped operating shaft 23 extending to the exterior of the casing.

The food conveying and supporting mechanism, hereinafter to be described in detail, is driven by a suitable power unit in the nature of an electric motor 24 mounted in the casing below the bottom-forming elements 13 and 14 of the oven and on the extreme bottom 25 of the casing. This motor 24 carries a gear case 26 which contains a pair of bevelled gears 27 and 28, the former of which may be assumed to be driven from the motor shaft, not shown, through speed-reducing gearing, not shown. The gear case 26 may be assumed to contain a suitable supply of lubricant. The bevelled gear 28 is mounted on and drives a vertical drive shaft 29 that is concentrically disposed within the casing and makes bearing in the top and bottom portions respectively of the gear case 26. This vertical drive shaft 29 extends upwardly through the center of the inner collecting element 14 of the oven bottom (see particularly Fig. 1). Loosely telescoped over the upper end portion of the drive shaft 29 is a removable driving hub 30 equipped with a plurality of radius arms 31. The hub 30 is driven from the shaft 29 through a driving pin 32 in the shaft 29, and which is received in slots 33 in the hub. In fact, the hub 30 seats upon the opposite ends of the pin 32. It will be understood that the hub 30 is upwardly displaceable from the drive shaft 29.

In the preferred arrangement illustrated, the central drive shaft 29 is provided above the hub 30 with a shaft extension 34 that is internally bored and loosely telescoped thereover, whereby to be readily removable therefrom. Also, in the preferred arrangement illustrated, the shaft extension 34 is equipped with an upwardly-extending inner or central food holder 35 in the nature of a skewer. This skewer 35 is removably seated in an upper bore of the shaft extension 34 and is provided above the extension 34 with an outwardly-projecting eave-acting flange 36 for directing juices outwardly and away from the shaft extension 34.

The free outer ends of the radius arms 31 engage suitable driving pins or abutments 37 on the inner ring 38 of the annular, planetary conveyor mechanism which concentrically surrounds the drive shaft extension 34. This planetary conveyor mechanism comprises the said inner ring 38, which serves as a drive ring, an internally-channeled outer ring 39 forming a race, an annular conveyor 40, and a circumferentially-spaced series of roller elements 41 journalled in the conveyor 40 and running between the drive ring 38 and race 39. In the form shown, the annular or circular conveyor 40 is made up of upper and lower rings 42 and 43 respectively connected by screws 44 and spacers 45. The roller elements 41 are provided with upper and lower bearing bosses journalled respectively in the upper and lower conveyor rings 42 and 43. By reference particularly to Fig. 5, it will be seen that the roller elements 41 are axially bored to each receive one of a circumferentially-spaced series of outer planetary food holders, which may take the form of skewers 46. Also by reference particularly to Fig. 5, it will be seen that the internal channel of the outer ring or race 39 is preferably conical or V-shaped in cross section, and that the roller elements 41 are provided with upper and lower conical surfaces 47 and 48 respectively for engagement with the upper and lower conical surfaces respectively of the race channel. By still further reference to Fig. 5, it will be seen that in the preferred arrangement, the roller elements are intermediately formed to provide V-shaped peripheral channels 49 therein for reception of the approximately V-shaped periphery of the drive ring 38. To facilitate original assembly of the annular conveyor unit or mechanism, the race 39 is composed of upper and lower sections connected by rivets or the like 50 and having a spacer ring 51 inserted therebetween.

Before going further, it should be made clear that when the motor 24 is operated, the vertical drive shaft 29 will be rotated through the speed-reducing gearing and bevelled gears 27 and 28; and the radius arm-equipped hub 30, the shaft extension 34, and the inner or central food holder 35 will be driven from the shaft 29 at the speed thereof. The drive ring 38 will be driven from the radius arms 31 at drive shaft speed, which will cause the roller elements 41 to travel about the race 39, and the said roller elements 41 will carry the conveyor ring 40 and food holders 46 therewith. In this manner, the circumferentially-spaced series of outer food holders 46 will partake of planetary motion; or, in other words, will travel about the drive shaft axis while being rotated on their own axes. Of course, the roller elements 41 and planetary food holders 46 will travel about the drive shaft axis at a reduced speed with respect to the speed of rotation of the drive shaft. It will, of course, be further clear from an examination of the drawings that the stationary race 39 is seated upon centering and spacing lugs 52 upstanding from the bottom of the cooking chamber, and is vertically displaceable therefrom as a unit when the radius arm-equipped hub 30 is removed.

The shanks of the skewers 46 of Figs. 1 and 5 and the shank of the substitute food holder 53 of Fig. 8 are provided with radially-projecting skirt-like flanges 54 for directing juices and other food drippings outwardly away from the food holder shanks, these being equivalent to the flange 36 of the center skewer or food holder 35.

In the preferred arrangement, the tray or pan 55 is superimposed over and is carried by the annular conveyor 40 and is provided with apertures for reception of the shanks of the planetary conveyors 46 or 53 of equivalent food holders. This tray or pan 55 is also centrally apertured to receive the drive shaft extension 34. It will be noted that the food holder flanges 36 and 54 direct juices and other food drippings away from the tray apertures just mentioned. The tray or pan 55 serves as a false rotary bottom for the cooking chamber, and is provided with concentric annular recesses or channels 56 and 57 at opposite sides of the circumferentially-spaced series of planetary food holders 46 and with a concentric annular recess or channel 58 immediately surrounding the central rotary food holder 35 and its supporting shaft extension 34. With this arrangement, it will be obvious that juices or other drippings from the planetary outer food holders 46 will be collected in the channels 56 and 57 while juices and other drippings from food carried by the central food holder 35 will be collected in the inner recess or channel 58. By reference particularly to Fig. 1, it will be seen that the channels 56, 57, and 58 are provided with independent drainage apertures 56', 57', and 58' respectively, all of which are radially spaced from the annular conveyor mechanism and central driving connections.

The drainage apertures 56' and 57' from the collecting channels that receive juices from the planetary food holders drain directly onto the downwardly and inwardly declined outer part 13 of the basin-forming bottom of the cooking chamber, which portion 13, it will be noted, is provided with an upstanding annular skirt 13', adjacent which is a drainage aperture 59 that leads to a juice-collecting receptacle 60 through a tubular conduit 61. In the preferred construction, the drainage aperture 58' for juices from food carried by the central food holder 35 drains directly into a pan 62 that is removably seated upon the radius arms 31, is centrally apertured to receive the shaft extension 34, and is provided surrounding said aperture with an upstanding annular curb-like flange 63. The juices collected in this pan 62 drain through a spout-equipped drainage aperture 64 therein to the inner basin-forming portion 14 of the bottom of the cooking chamber, wherein they are directed through a spout-equipped drainage aperture 64' to a collecting receptacle 65. The basin-forming portion 14 of the bottom of the cooking chamber is centrally apertured to receive the hub element 30 and is provided around said central aperture with an upstanding curb-acting annular flange 66. By reference particularly to Fig. 1, it will be seen that the central basin-acting portion of the cooking chamber bottom is removably seated on circumferentially-spaced brackets 67 carried by the bottom portion 13; and by further reference to Fig. 1 it will be seen that the drainage apertures 64, 59, and 64' are located at the lowest points in the elements in which they are respectively formed, so that complete drainage is possible.

From the above, it will be clear that the annular conveyor mechanism and central driving connections will be maintained free of juices and other drippings from the food articles carried both by the central food holder 35 and by the planetary outer food holders 46, 53, or their equivalents, thereby greatly decreasing the necessary frequency of cleaning and the problem of servicing and maintaining the conveyor mechanism and drive connections; that the annular conveyor mechanism, its food holders, and the inner food holder are all very readily removable; that the annular conveyor mechanism is removable, replaceable, and may be washed or cleaned as a unit; and that the juices falling from foods carried by the planetary outer food holders and the juices from foods carried by the inner food holder will be maintained separate and separately collected. Otherwise, however, the operation of the machine will be substantially identical to the machine illustrated in my prior Patent No. 2,179,646. Of course, it will be understood that the juice receptacles 60 and 65 are independently removable from the casing. The motor 24 may, of course, be operated from any suitable source of potential, and will preferably be under control of a switch S.

As indicated, the article holders 53 may be used as substitutes for the skewer type of article holders 46. The skewer type of article holders 46 and 35 are, of course, primarily intended for use in supporting meat cuts, fowl, vegetables, and the like, into the bodies of which they may be inserted. The modified article holders 53 are, on the other hand, intended for holding various hot dishes, pies, cakes, bread, and the like, any of which and many other things may be successfully cooked in the machine described. The article holders 53 each comprise a shank 67', the upper end of which is rigidly anchored to a disc-like element 68. Extending upwardly from diametrically opposite portions of the element 68 are risers 69 carrying segmental shelf elements 70 and being connected at the top by a disc-like element 71. The segmental shelf elements 70 are adapted to directly engage and support the edges of pie tins and the like or suitable disc-like shelves, not shown, upon which other receptacles may be placed.

The planetary conveyor mechanism disclosed herein is claimed in my co-pending application filed by me on November 12, 1946, under Serial No. 709,273, and which application was filed as a division of this application.

What I claim is:

1. In a device of the class described, a casing providing a cooking chamber, heating means for the cooking chamber, the bottom of said cooking chamber being formed to provide concentrically disposed inner and outer dished juice-collecting portions, an inner food holder concentrically disposed in the cooking chamber above the said inner collecting portion, and an annular food holder and conveyor concentrically disposed in the cooking chamber above said outer collecting portion and about said inner food holder.

2. The structure defined in claim 1, in which the bottom of the cooking chamber is provided with independent drainage apertures from the said inner and outer collecting portions thereof.

3. The structure defined in claim 1, in which the bottom of the cooking chamber is provided with independent drainage apertures from the said inner and outer collecting portions thereof, and in further combination with independent collecting vessels below the bottom of the cooking chamber, one of said vessels being disposed to receive juices from the inner of said collecting portions and the other thereof being disposed to receive juices from the outer of said collecting portions.

4. In a device of the class described, a casing providing a cooking chamber, heating means for the cooking chamber, the bottom of said cooking chamber being formed to provide concentrically disposed inner and outer dished juice-collecting portions, a power-driven rotary food holder concentrically disposed in the cooking chamber above the inner collecting surface, an annular conveyor disposed concentrically of the cooking chamber above the outer collecting surface and about said rotary inner food holder, a circumferentially-spaced series of outer food holders journalled on said annular conveyor, means for driving the annular conveyor, and means rotating said outer food holders on their own axes under rotation of the annular conveyor.

5. The structure defined in claim 4, in which the bottom of the cooking chamber is provided with independent drainage openings from the said inner and outer collecting portions thereof.

6. The structure defined in claim 4, in which the bottom of the cooking chamber is provided with independent drainage openings from the said inner and outer collecting portions thereof, and in further combination with independent collecting vessels below the bottom of the cooking chamber, one of said vessels being disposed to receive juices from the inner of said collecting portions and the other thereof being disposed to receive juices from the outer of said collecting portions.

7. In a device of the class described, a casing providing a cooking chamber, heating means for the cooking chamber, the bottom of said cooking chamber being formed to provide concentrically disposed inner and outer dished juice-collecting portions, an inner food holder concentrically disposed in the cooking chamber above said inner collecting portion, an annular outer food holder and conveyor concentrically disposed in the cooking chamber above the outer collecting portion and about said inner food holder, said inner and outer collecting portions of the bottom of the cooking chamber being provided with independent drainage apertures, and a tray disposed adjacent the bottom of the cooking chamber above the said annular conveyor and serving as a false bottom of the cooking chamber, said tray having concentric inner and outer collecting recesses, the inner of said collecting recesses being provided with a drainage aperture draining into the inner collecting portion of the bottom of the cooking chamber and the outer collecting recess of the tray being provided with a drainage aperture draining into the outer collecting portion of the bottom of the cooking chamber.

8. The structure defined in claim 7 in further combination with independent collecting vessels below the bottom of the cooking chamber and positioned one to receive juices from a drainage aperture in the inner collecting portion of the bottom of the cooking chamber and the other to receive juices from the outer collecting portion of the bottom of the cooking chamber.

9. The structure defined in claim 7 in further combination with a centrally located collecting basin interposed between the tray and the inner collecting portion of the bottom of the cooking chamber to receive juices directly from the inner collecting recess of the tray and having a drainage aperture above the inner collecting portion of the cooking chamber bottom.

10. In a device of the class described, a casing providing a cooking chamber, heating means adjacent the sides of the cooking chamber, the bottom of said cooking chamber being formed to provide a juice-collecting basin, a rotary conveyor located above the basin-forming bottom of the cooking chamber, a juice-collecting pan disposed over and carried by the rotary conveyor and having a drainage aperture over the basin-forming portion of the bottom of the cooking chamber and in radially offset relation to the rotary conveyor, a circumferentially-spaced series of food holders carried by the rotary conveyor and extending upwardly therefrom through apertures in said tray, said food holders being provided with projecting flanges overlying the said tray apertures for directing juices away from said apertures.

11. The structure defined in claim 10 which further includes a juice receptacle located below the basin-forming bottom of the cooking chamber, and in which the said basin-forming bottom is provided with a drainage aperture above said receptacle.

12. In a device of the class described, a casing providing a cooking chamber, heating means adjacent the sides of the cooking chamber, a power-driven rotary shaft extending upwardly through the bottom of the cooking chamber at the axis thereof, an inner rotary food holder mounted on said shaft, an annular rotary conveyor concentrically disposed within the cooking chamber and surrounding said shaft, a circumferentially-spaced plurality of planetary outer food holders carried by and projecting upwardly from said rotary conveyor, connections for driving the rotary conveyor from said power-driven shaft, means for rotating the planetary food holders on their own axes upon rotation of the annular conveyor, and a false bottom for the cooking chamber carried by said conveyor and having apertures therein through which the planetary outer food holders extend, said planetary food holders being upwardly displaceable from the conveyor through said apertures, said false bottom being formed to provide an inner annular channel for receiving juices directly from food supported by the rotary inner food holder and being formed with an outer annular channel for receiving juices from food supported by the planetary food holders, said false bottom being provided with independent drainage apertures from the inner and outer channels thereof, the bottom of the cooking chamber below the annular conveyor being formed to provide a substantially annular inner juice-receiving channel immediately surrounding the power-driven central shaft and below the inner channel of the false bottom and being formed with an outer juice-receiving channel of substantially annular shape below the outer channel of the false bottom.

13. The structure defined in claim 12 in further combination with an annular pan interposed between the bottom of the cooking chamber and the said false bottom thereof and disposed to receive juices directly from the drainage aperture of the inner channel of said false bottom, said pan being provided with a drainage aperture above the inner channel of the bottom of the cooking chamber.

14. The structure defined in claim 12, in which the said inner and outer channels of the bottom of the cooking chamber are provided with independent drainage apertures.

15. In a device of the class described, a casing providing a cooking chamber, heating means for the cooking chamber, an inner food holder approximately concentrically disposed in the cooking chamber, a rotary outer food holder disposed in the cooking chamber in radially outwardly-spaced relation to the said inner food holder, means driving the outer food holder about the axis of the inner food holder, and concentric inner and outer juice-collecting casing portions respectively underlying the said inner and outer food holders.

16. The structure defined in claim 15 in which said juice-collecting casing portions are provided with independent drainage apertures.

17. The structure defined in claim 15 in which said juice-collecting casing portions are provided with independent drainage apertures, and in further combination with independent collecting vessels each orientated and arranged to receive juices from the aperture of a different juice-collecting casing portion.

MICHAEL P. SPARTALIS.

REFERENCES CITED

The following references are of record in the file of this patent:

UNITED STATES PATENTS

| Number | Name | Date |
| --- | --- | --- |
| 1,862,485 | McEwan | June 7, 1932 |
| 2,040,016 | Sanders | May 5, 1936 |
| 2,179,646 | Spartalis | Nov. 14, 1939 |